US011229324B2

(12) United States Patent
Abo

(10) Patent No.: US 11,229,324 B2
(45) Date of Patent: Jan. 25, 2022

(54) MILL FOR GRANULAR FOOD

(71) Applicant: KAI R&D CENTER CO., LTD., Gifu (JP)

(72) Inventor: Akira Abo, Gifu (JP)

(73) Assignee: KAI R&D CENTER CO., LTD., Gifu (JP)

( * ) Notice: Subject to any disclaimer, the term of this patent is extended or adjusted under 35 U.S.C. 154(b) by 0 days.

(21) Appl. No.: 17/055,339

(22) PCT Filed: Dec. 16, 2019

(86) PCT No.: PCT/JP2019/049217
§ 371 (c)(1),
(2) Date: Nov. 13, 2020

(87) PCT Pub. No.: WO2020/225939
PCT Pub. Date: Nov. 12, 2020

(65) Prior Publication Data
US 2021/0219781 A1  Jul. 22, 2021

(30) Foreign Application Priority Data

May 7, 2019  (JP) .............................. JP2019-087588

(51) Int. Cl.
*A47J 42/08* (2006.01)
*A47J 42/02* (2006.01)
*A47J 42/10* (2006.01)

(52) U.S. Cl.
CPC ................ *A47J 42/08* (2013.01); *A47J 42/02* (2013.01); *A47J 42/10* (2013.01)

(58) Field of Classification Search
CPC ............. A47J 42/02; A47J 42/08; A47J 42/10
See application file for complete search history.

(56) References Cited

U.S. PATENT DOCUMENTS 5,082,190 A * 1/1992 Chen ...................... A47J 42/08
 241/169.1
6,405,951 B1 * 6/2002 Wu ......................... A47J 42/08
 241/169.1

(Continued)

FOREIGN PATENT DOCUMENTS

JP 1986-122749 U 8/1986
JP 2007-029714 A 2/2007

(Continued)

OTHER PUBLICATIONS

Machine translation of Notice of Reasons for Refusal in JP Application No. 2019-087588; dated Mar. 2, 2020.

*Primary Examiner* — Faye Francis
(74) *Attorney, Agent, or Firm* — White & Case LLP

(57) ABSTRACT

A mill for granular food including an adjuster attached to a barrel unit and rotatable relative to the barrel unit and to be prevented from coming off the barrel unit in an axis direction. A ground particle size for granular food is adjusted by rotating the adjuster. A movement attachment and detachment unit that inscribes an outer mill unit in the barrel unit and the adjuster, and makes the outer mill unit movable in the axis direction and makes the outer mill unit attachable and detachable. A rotary shaft extending from a rotary operation unit extends downward along a mill. An inner mill unit is attached to the rotary shaft. The adjuster is provided with a movement restricting unit that restricts movement of the inner mill unit to a predetermined position. Releasing the restriction makes the inner mill unit and the outer mill unit extractable.

8 Claims, 9 Drawing Sheets

(56) References Cited

U.S. PATENT DOCUMENTS

| | | | | |
|---|---|---|---|---|
| 6,443,377 B1* | 9/2002 | Cheng | A47J 42/08 | 241/169.1 |
| 6,851,635 B2* | 2/2005 | McCowin | A47J 42/10 | 241/169.1 |
| 6,948,672 B2* | 9/2005 | Herren | A47J 42/08 | 241/168 |
| 7,604,191 B2* | 10/2009 | Pai | A47J 42/08 | 241/169.1 |
| 7,878,437 B2* | 2/2011 | Rice | A47J 42/04 | 241/189.1 |
| 8,240,586 B2* | 8/2012 | Wilson | A47J 42/08 | 241/168 |
| 8,444,074 B2* | 5/2013 | Wu | A47J 42/08 | 241/169.1 |
| 9,516,975 B2* | 12/2016 | Wong | A47J 42/50 | |
| 9,578,989 B2* | 2/2017 | Lægdsgaard | A47J 42/10 | |
| 9,763,541 B2* | 9/2017 | Krus | A47J 42/08 | |
| 2002/0117566 A1* | 8/2002 | Cheng | A47J 42/08 | 241/169.1 |
| 2008/0093489 A1* | 4/2008 | Hadj-Chikh | A47J 42/08 | 241/169.1 |
| 2009/0134256 A1* | 5/2009 | Rice | A47J 42/08 | 241/169.1 |
| 2011/0162538 A1* | 7/2011 | Wu | A47J 42/08 | 99/537 |
| 2015/0257600 A1* | 9/2015 | Krus | A47J 42/46 | 241/169.1 |
| 2015/0297033 A1* | 10/2015 | Wong | A47J 42/50 | 241/101.3 |
| 2016/0015214 A1* | 1/2016 | Lægdsgaard | A47J 42/10 | 241/259 |
| 2020/0315401 A1* | 10/2020 | Deuber | A47J 31/42 | |

FOREIGN PATENT DOCUMENTS

| | | |
|---|---|---|
| JP | 3184678 U | 7/2013 |
| JP | 2014-018755 A | 2/2014 |
| JP | 2016-064115 A | 4/2016 |
| WO | 2019142758 A1 | 7/2019 |

* cited by examiner

MILL FOR GRANULAR FOOD

CROSS-REFERENCE TO RELATED APPLICATION

This application is a national stage filing under 35 U.S.C. § 371 of International Application No. PCT/JP2019/049217, filed on Dec. 16, 2019. The specification of the foregoing application is incorporated herein by reference in its entirety.

TECHNICAL FIELD

The present invention relates to a mill for granular food such as pepper, sesame, or rock salt, which is mainly for general household use, and which is a mill allowing adjustment of a ground particle size for granular food and allowing an inner mill unit and an outer mill unit to be separated from a mill body and to be extracted.

BACKGROUND ART

Various types of mills allowing adjustment of a ground particle size for granular food have been suggested. In a mill disclosed in patent document 1, for example, an adjusting knob for adjusting a particle size is provided at an ejection opening, and a particle size is adjusted by rotating the adjusting knob. However, the knob is formed in a comparatively small size and such a small knob is required to be rotated with fingertips holding the knob. This involves delicate work which causes difficulty in the rotation. Further, the presence of the knob in the ejection opening also causes a problem of making the rotation of the knob difficult as the outer peripheral wall of the ejection opening gets in the way of the rotation.

In this regard, in a suggested mill such as the mill disclosed in patent document 2, an adjuster for adjusting a particle size is formed into a diameter equal to that of the outer peripheral wall of the mill to facilitate rotary operation. However, the configuration of this mill does not allow a rotary blade and a movable blade to be separated from a container connector and to be extracted easily. This mill does not allow the rotary blade and the movable blade to be extracted and cleaned. Hence, when such a mill is used for the first time for grinding sesame, for example, the scent of the sesame remains in the blades to make the mill unavailable for use in other types of food. More specifically, as food is compressed and ground in such a manner as to be crushed with the blades, the scent of the food unavoidably remains strong in the blades. For this reason, a mill used for the first time for sesame inevitably becomes a mill dedicated to sesame, and another mill is required for grinding other types of food.

CITATION LIST

Patent Documents

Patent Document 1: Japanese Patent Application Publication No. 2007-29714
Patent Document 2: Japanese Patent Application Publication No. 2016-64115
Patent Document 3: Registered Japanese Utility Model Publication No. 3184678

SUMMARY

Technical Problem

As described above, a mill not allowing extraction and cleaning of an inner mill unit and an outer mill unit is unintentionally limited to use in a single type of food and thus is not available for use in various types of food. To make one mill available for use in various types of food, the inner mill unit and the outer mill unit are required to be extracted and cleaned. A mill allowing extraction of the inner mill unit and the outer mill unit, like the mill disclosed in patent document 3, for example, is configured to extract the mill units by disassembling the mill into parts finely. To fulfill the purpose of cleaning the inner mill unit and the outer mill unit, however, only extraction of these units is required, while finely disassembling the mill into parts is unnecessary. Then, the present invention is intended to provide a mill for granular food allowing separation and extraction of an inner mill unit and an outer mill unit easily without disassembling a mill finely, and allowing adjustment of a ground particle size for food.

Solution to Problem

In certain embodiments, a mill for granular food in which an adjuster is attached to a barrel unit so as to be rotatable relative to the barrel unit and so as to be prevented from coming off the barrel unit in an axis direction, and in which a ground particle size for granular food is adjusted by rotating the adjuster. The mill comprises means that inscribes an outer mill unit in the barrel unit and the adjuster, and makes the outer mill unit movable in the axis direction and makes the outer mill unit attachable and detachable. A rotary shaft extending from a rotary operation unit extends downward along the mill. An inner mill unit is attached to the rotary shaft. The adjuster is provided with a movement restricting means that restricts movement of the inner mill unit to a predetermined position. Releasing the restriction imposed by the movement restricting means makes the inner mill unit and the outer mill unit extractable.

In certain embodiments, the means that makes the outer mill unit inscribed in the barrel unit and the adjuster movable in the axis direction is configured to threadedly engage the adjuster and the outer mill unit, and to make engagement between a vertical groove formed at one of an inner peripheral surface of the barrel unit and an outer peripheral surface of the outer mill unit inscribed in the inner peripheral surface; and a projection formed at the other surface to be inserted into the vertical groove; thereby making the outer mill unit movable in the axis direction through rotation of the adjuster and prohibiting rotation of the outer mill unit relative to the barrel unit.

In certain embodiments, the means that makes the outer mill unit inscribed in the barrel unit and the adjuster attachable and detachable is configured to attach and detach the outer mill unit by moving the outer mill unit in the axis direction and making threaded engagement between the adjuster and the outer mill unit or releasing the adjuster and the outer mill unit from the threaded engagement through the rotation of the adjuster.

In certain embodiments, the movement restricting means that restricts movement of the inner mill unit to the predetermined position is a movement restricting unit attached in a detachable manner to the adjuster, the movement restricting unit comprises a circular ring part and a stopper part provided at the center of the ring part with the intervention of a plurality of ribs extending from the ring part in a direction toward the center, the ring part has an outer peripheral surface provided with a threaded engagement part, and the threaded engagement part is threadedly engaged with a threaded engagement part formed at an inner peripheral surface of the adjuster to threadedly attach the movement restricting unit in a detachable manner to the adjuster.

In certain embodiments, a pressure unit with a blade for pressing the food downward is attached to the rotary shaft to be movable in the axis direction and to be rotatable together with the rotary shaft, and the pressure unit is biased downward by an elastic unit.

In certain embodiments, the elastic unit for biasing the pressure unit downward is a coil spring attached while being wound loosely around the rotary shaft.

Advantageous Effects of Invention

In certain embodiments, the adjuster is attached to the barrel unit to be rotatable relative to the barrel unit and to be prevented from coming off the barrel unit in the axis direction, and a ground particle size for granular food is adjusted by rotating the adjuster. The mill comprises the means that inscribes the outer mill unit in the barrel unit and the adjuster, and makes the outer mill unit movable in the axis direction and makes the outer mill unit attachable and detachable. The rotary shaft extending from the rotary operation unit extends downward along the mill. The inner mill unit is attached to the rotary shaft. The adjuster is provided with the movement restricting means that restricts movement of the inner mill unit to the predetermined position. Releasing the restriction imposed by the movement restricting means makes the inner mill unit and the outer mill unit extractable. Thus, for cleaning the inner mill unit and the outer mill unit, the intended inner mill unit and outer mill unit can be extracted without disassembling the mill entirely. This facilitates easy cleaning of the inner mill unit and the outer mill unit and facilitates easy attachment of both of these mill units after the cleaning, thereby reducing working load.

In certain embodiments, the means that makes the outer mill unit inscribed in the barrel unit and the adjuster movable in the axis direction is configured to threadedly engage the adjuster and the outer mill unit, and to make engagement between the vertical groove formed at one of the inner peripheral surface of the barrel unit and the outer peripheral surface of the outer mill unit inscribed in the inner peripheral surface; and the projection formed at the other surface to be inserted into the vertical groove; thereby making the outer mill unit movable in the axis direction through rotation of the adjuster and prohibiting rotation of the outer mill unit relative to the barrel unit. As the means that makes the outer mill unit movable in the axis direction is configured using the threaded engagement part, the vertical groove, and the projection to be inserted into the vertical groove, this achieves a simple configuration to avoid any complication of the manufacturing steps.

In certain embodiments, the means that makes the outer mill unit inscribed in the barrel unit and the adjuster attachable and detachable is configured to attach and detach the outer mill unit by moving the outer mill unit in the axis direction and making threaded engagement between the adjuster and the outer mill unit or releasing the adjuster and the outer mill unit from the threaded engagement through the rotation of the adjuster. As attachment and detachment of the outer mill unit is done by the adjuster, the adjuster can be responsible for both the operation of attaching and detaching the outer mill unit and the operation of adjusting a ground particle size for the granular food. This requires only one operation unit to achieve a simple configuration, while avoiding mistaken use of an operation unit in the presence of a plurality of operation units.

In certain embodiments, the movement restricting unit for the inner mill unit comprises the circular ring part and the stopper part provided at the center of the ring part with the intervention of the plurality of ribs extending from the ring part in the direction toward the center, the ring part has the outer peripheral surface provided with the threaded engagement part, and the threaded engagement part is threadedly engaged with the threaded engagement part formed at the inner peripheral surface of the adjuster to threadedly attach the movement restricting unit in a detachable manner to the adjuster. This allows the inner mill unit to be attached and detached easily through a simple operation of merely rotating the movement restricting unit.

In certain embodiments, the pressure unit with the blade for pressing the food downward is attached to the rotary shaft to be movable in the axis direction and to be rotatable together with the rotary shaft, and the pressure unit is biased downward by the elastic unit. Rotating the rotary operation unit during use of the mill rotates the blade at the pressure unit together with the inner mill unit. The pressure unit is biased downward by the elastic unit. Thus, if large granular food is to be pushed out with the blade, the pressure unit becomes functional to handle this food by moving up automatically. If the size of the granular food is irregular and not constant, the pressure unit becomes functional to handle this food by moving up and down automatically in response to the size of the granular food.

In certain embodiments, the elastic unit for biasing the pressure unit downward is the coil spring attached while being wound loosely around the rotary shaft. As the coil spring is fitted by being wound loosely around the rotary shaft, the coil spring is attached easily and does not require wide space.

DESCRIPTION OF EMBODIMENTS

Figure 1:
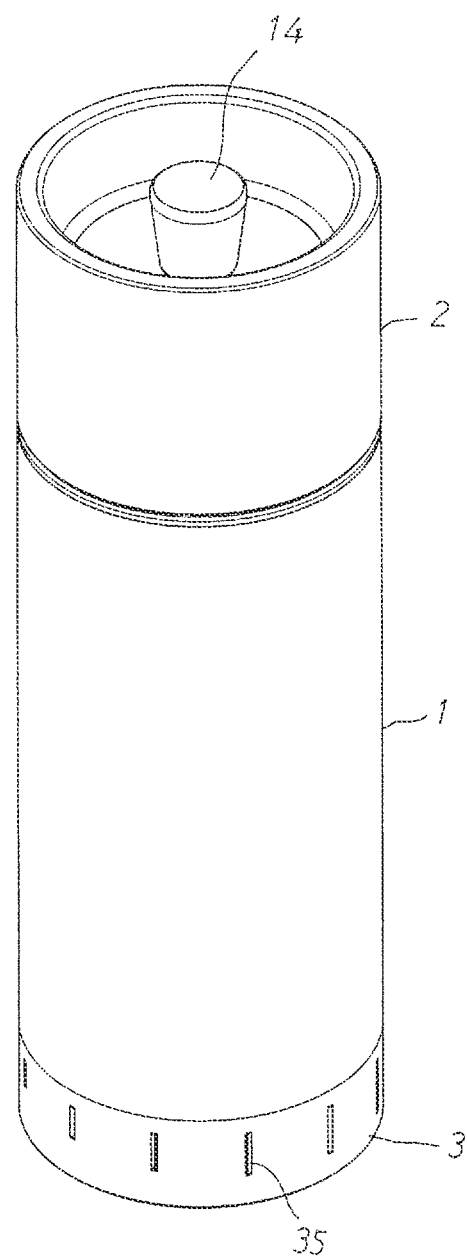
FIG. 1 is a perspective view of the present invention.
Figure 2:
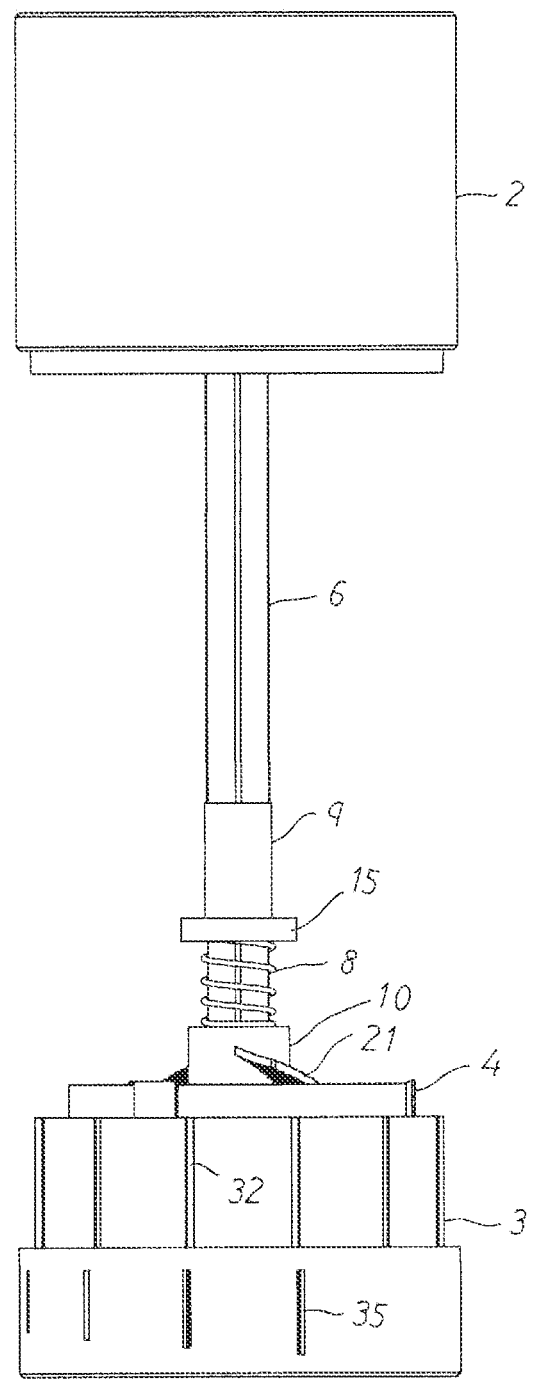
FIG. 2 is a front view prepared by removing a barrel unit of the present invention.
Figure 3:
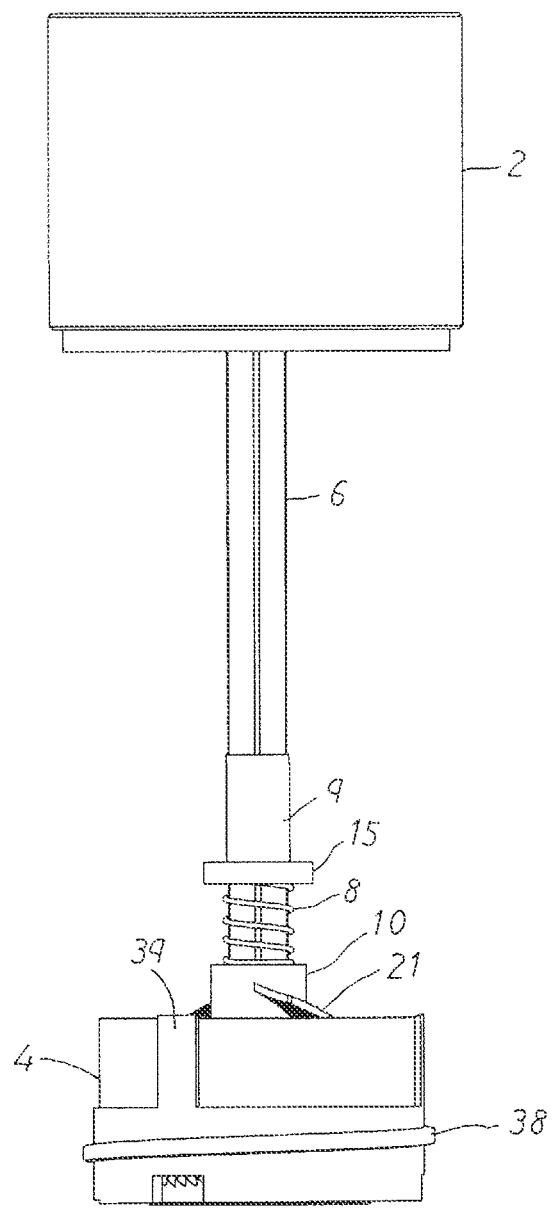
FIG. 3 is a front view prepared by removing an adjuster from FIG. 2.

An embodiment of the present invention will be described next by referring to the drawings. The embodiment includes a barrel unit 1, a rotary operation unit 2, an adjuster 3, an outer mill unit 4, an inner mill unit 5, a rotary shaft 6, a movement restricting unit 44, a coil spring 8, a coil spring receiver 9, and a pressure unit 10.

Figure 5:
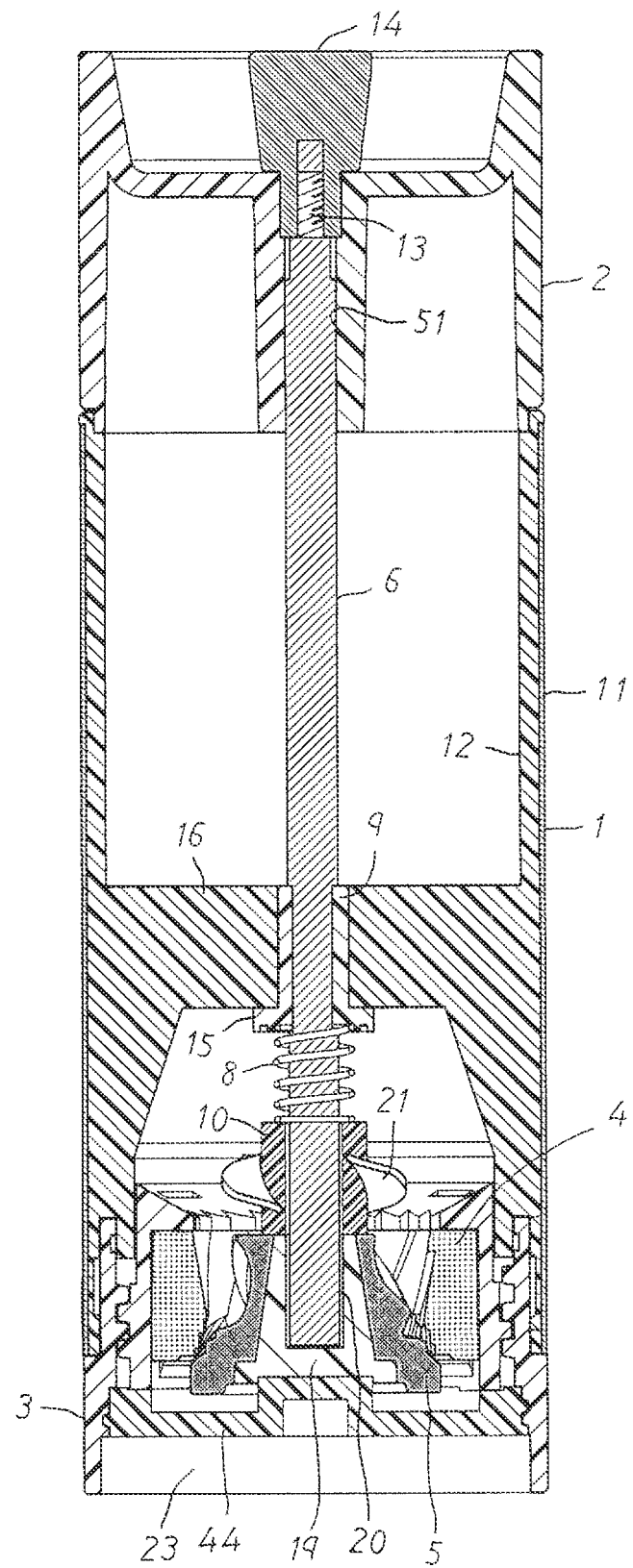
FIG. 5 is a vertical cross-sectional view of the present invention.

The barrel unit 1 is formed into a circular cylindrical shape, and has a double structure with a metallic outer wall 11 and an inner wall 12 made of synthetic resin fixedly inscribed in the outer wall 11. As shown in FIG. 5, the rotary operation unit 2 is attached to the upper end of the barrel unit 1, a passage hole 51 having a square cross-sectional shape is formed in the rotary operation unit 2, and the rotary shaft 6 having a square cross-sectional shape is passed through the passage hole 51. Thus, as the rotary operation unit 2 is rotated, both the rotary operation unit 2 and the rotary shaft 6 rotate relative to the barrel unit 1. The rotary operation unit 2 and the rotary shaft 6 are coupled by a method of threadedly engaging a nut 14 with a male screw 13 formed at the upper end of the rotary shaft 6 and rotating the nut 14 to secure the rotary operation unit 2. The rotary shaft 6 has a lower part partially thinned, and the coil spring receiver 9 is attached to this thinned part. The coil spring receiver 9 has a slit formed in a longitudinal direction and is formed into a circular cylindrical shape with a C-shaped cross section. The coil spring receiver 9 has a lower end where a flange 15 is formed. The coil spring 8 is attached below the flange 15 while being wound loosely around the rotary shaft 6. A rib 7 and a bearing 16 are formed integrally with the inner wall 12 inside the barrel unit 1. The rotary shaft 6 is passed through a shaft hole 17 formed at the bearing 16. The coil spring receiver 9 on the passed rotary shaft 6 is inscribed in the shaft hole 17 and rotates together with the rotary shaft 6.

Figure 6:
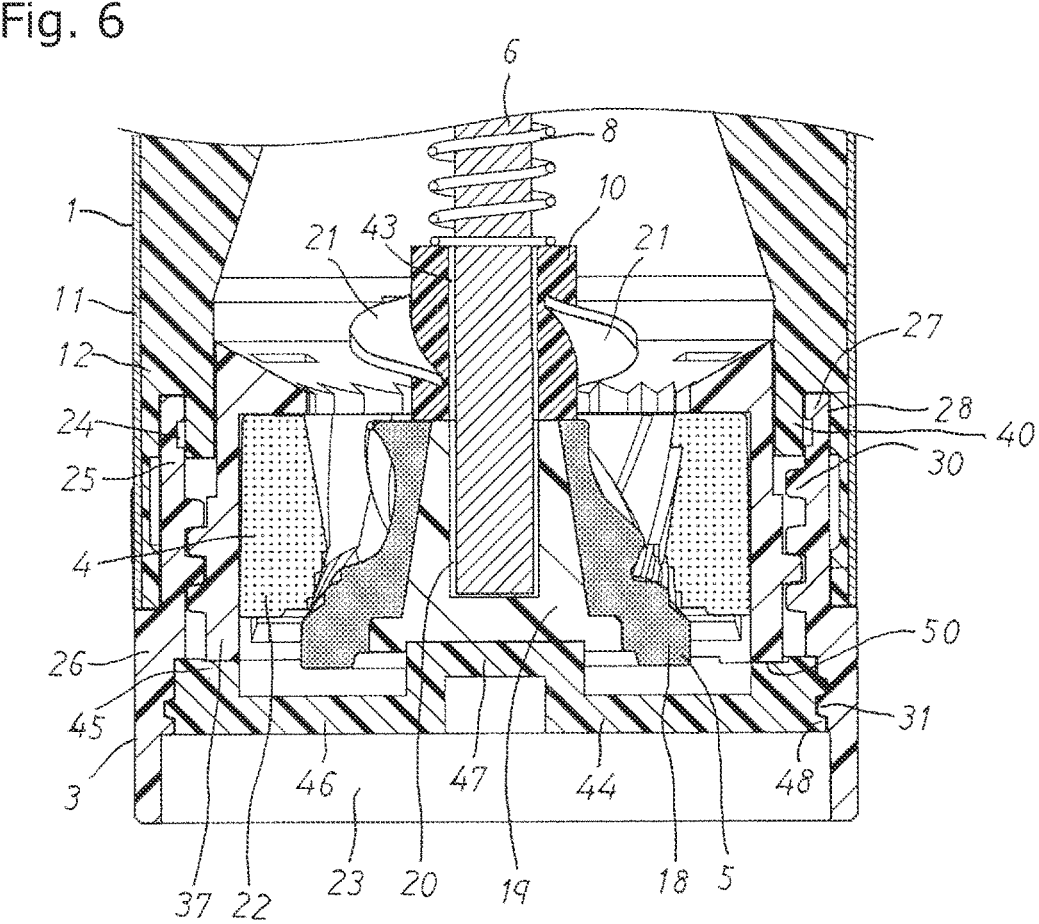
FIG. 6 is an enlarged vertical cross-sectional view showing a principal part of the present invention.
Figure 7:
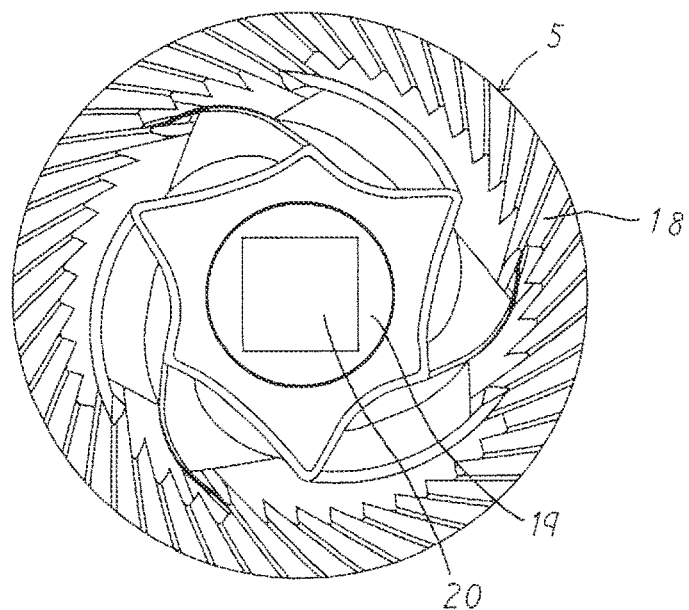
FIG. 7 is a plan view of an inner mill unit.

As shown in FIG. 6, the inner mill unit 5 is formed into a substantially truncated conical shape, and forms one mill unit with a core member 19 made of synthetic resin fixed in a ceramic mill blade member 18. The mill blade member 18 is certainly not limited to a member made of ceramic material, and the core member 19 is certainly not limited to a member made of synthetic resin. As shown in FIG. 7, the core member 19 has a shaft insertion hole 20 extending downward from the upper surface of the core member 19. The shaft insertion hole 20 is a hole for insertion of a tip of the rotary shaft 6 and has a closed bottom. However, the shaft insertion hole 20 is not always required to have a closed bottom. The shaft insertion hole 20 has a square cross-sectional shape. This is intended to conform to the square cross-sectional shape of the rotary shaft 6 to be inserted into the shaft insertion hole 20.

Figure 4:
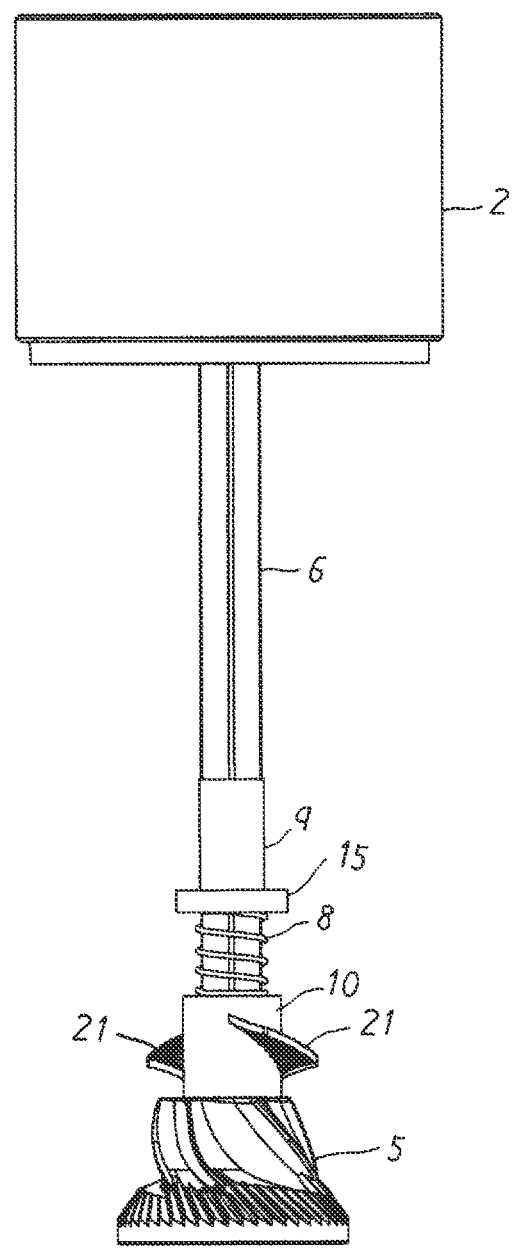
FIG. 4 is a front view prepared by removing an outer mill unit and a movement restricting unit from FIG. 3.

The pressure unit 10 is formed into a circular cylindrical shape. As shown in FIG. 6, the pressure unit 10 has a shaft passage hole 43 formed in an axis direction and the rotary shaft 6 is passed through the shaft passage hole 43. Like the rotary shaft 6, the shaft passage hole 43 has a square cross-sectional shape. The pressure unit 10 rotates together with the rotary shaft 6. As shown in FIGS. 4 and 6, two blades 21 are provided on an outer peripheral surface. The blades 21 are tilted to angles at which food is pushed out into between the outer mill unit 4 and the inner mill unit 5. In response to the biasing force of the coil spring 8, the blades 21 function to push out food, such as pepper, stored in the barrel unit 1. As shown in FIG. 4, the blades 21 are each serrated on the surfaces of both sides for slip resistance to allow pushing out of food efficiently. The pressure unit 10 is formed into a vertically symmetric shape. Thus, even if the pressure unit 10 is attached upside down, the pressure unit 10 and the blades 21 still fulfill the same function. The pressure unit 10 is attached to the rotary shaft 6 to be movable in the axis direction. Thus, when the pressure unit 10 receives the biasing force of the coil spring 8, the pressure unit 10 is elastically movable upward against the applied biasing force. As a result, if large pieces of granular food are to be pushed out with the blades 21, the pressure unit 10 becomes functional to handle this food by moving up automatically. If the size of granular food is irregular and not constant, the pressure unit 10 becomes functional to handle this food by moving up and down automatically in response to the size of the granular food.

As shown in FIG. 4, as described above, the coil spring receiver 9 is fixed to the rotary shaft 6, and the coil spring 8 is attached below the flange 15 formed at the lower end of the coil spring receiver 9 while being wound loosely around the rotary shaft 6. While the inner mill unit 5 and the pressure unit 10 are located at a lower part of the rotary shaft 6, these units are not coupled to the rotary shaft 6 but are movable in the axis direction. Thus, in the state of FIG. 4 without means of restricting downward movement, the inner mill unit 5 and then the pressure unit 10 drop downward. In response to this, the present invention includes restricting means of preventing the drop of the inner mill unit 5, as described later.

As shown in FIG. 1, the circular cylindrical adjuster 3 is attached to the lower end of the barrel unit 1. As shown in FIG. 6, the adjuster 3 has an ejection opening 23 for ejection of ground granular food. The adjuster 3 is attached to be rotatable relative to the barrel unit 1 and to be unmovable in the axis direction. Rotating the adjuster 3 allows the outer mill unit 4 inscribed in the adjuster 3 to move in the axis direction. Moving the outer mill unit 4 allows adjustment of a gap between a mill blade member 22 of the outer mill unit 4 and the mill blade member 18 of the inner mill unit 5, thereby allowing change in a ground particle size for granular food.

Figure 9:
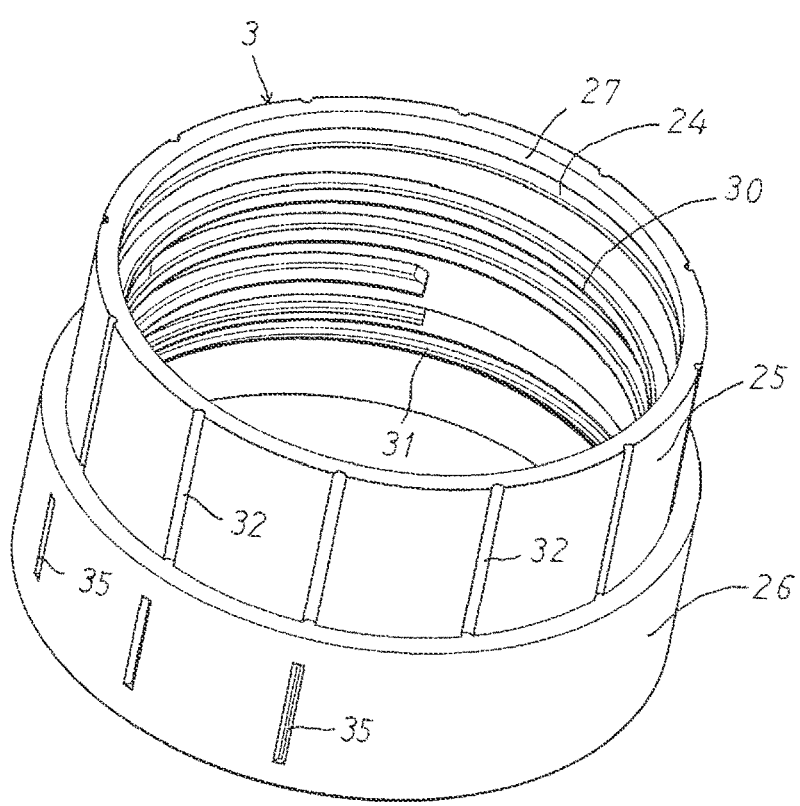
FIG. 9 is a perspective view of the adjuster.
Figure 10:
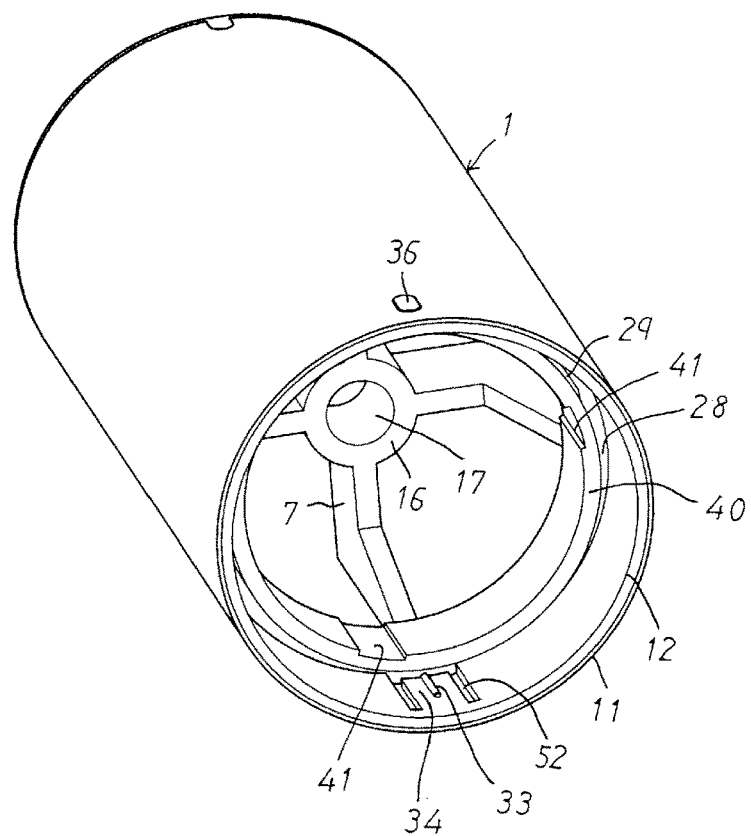
FIG. 10 is a perspective view of the barrel unit taken from below.
Figure 11:
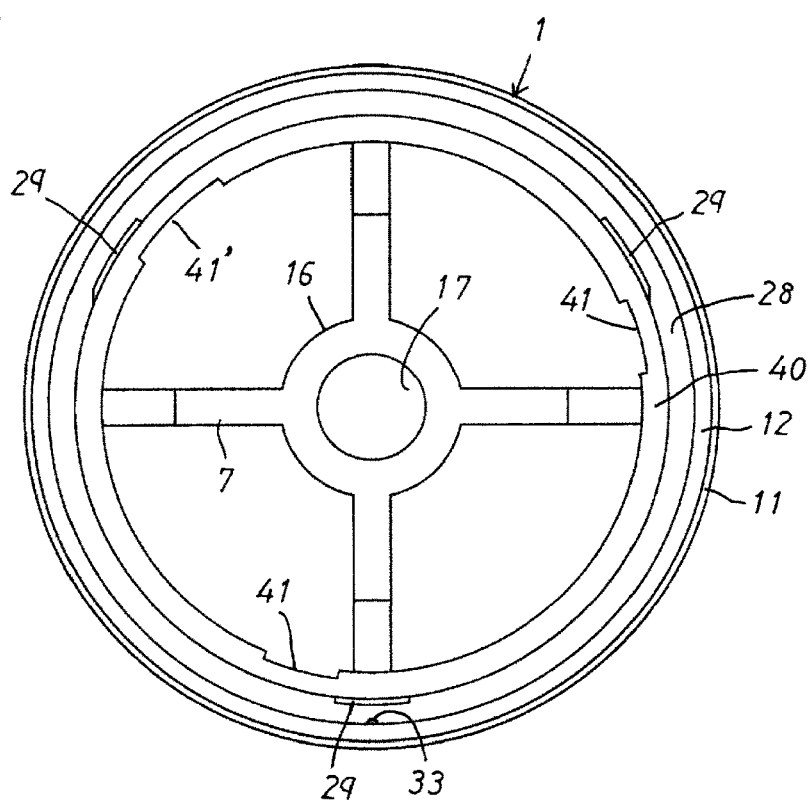
FIG. 11 is a bottom view of the barrel unit shown in FIG. 10.

A method of attaching the adjuster 3 to the barrel unit 1 will be described next. As shown in FIG. 9, the adjuster 3 is composed of a first peripheral wall 25 as an upper half and a second peripheral wall 26 as a lower half having a greater diameter than the first peripheral wall 25. The first peripheral wall 25 includes an upper part 27, and an inner peripheral groove 24 is formed along the entire peripheral surface of the upper part 27. A first threaded engagement part 30 is formed under the inner peripheral groove 24. A second threaded engagement part 31 is formed along the inner peripheral surface of the second peripheral wall 26. The inner diameter of the second threaded engagement part 31 is greater than that of the first threaded engagement part 30. The first threaded engagement part 30 and the second threaded engagement part 31 may be formed continuously or may be formed partially along the entire inner peripheral surfaces. As shown in FIGS. 6, 10, and 11, a fit-in groove forming wall 40 is provided at a lower part of the inner wall 12 to form a fit-in groove 28 in which the upper part 27 of the adjuster 3 including the inner peripheral groove 24 is to be fitted rotatably. The fit-in groove 28 extends along the entire periphery of the inner wall 12. The upper part 27 of the adjuster 3 is fitted in the fit-in groove 28 to rotatably attach the adjuster 3 to the barrel unit 1. As shown in FIGS. 10 and 11, the fit-in groove forming wall 40 forming the fit-in groove 28 has an inner surface facing the fit-in groove 28 on which three engagement projections 29 are formed. When the upper part 27 of the adjuster 3 is fitted in the fit-in groove 28, the engagement projections 29 are engaged with the inner peripheral groove 24 to prevent the adjuster 3 from coming off the barrel unit 1 in the axis direction. Namely, the adjuster 3 becomes unmovable in the axis direction. As shown in FIG. 9, many strip grooves 32 are formed on the outer peripheral surface of the first peripheral wall 25. The strip grooves 32 are provided to rotate the adjuster 3 stepwise. More specifically, as shown in FIG. 10, an angular U-shape slit 52 is formed at the inner wall 12 to form a tongue piece 34, and an engagement part 33 to be engaged with the strip groove 32 is formed at the tongue piece 34. The tongue piece 34 is formed to be thinner than the thickness of a part of the inner wall 12 in the presence of the tongue piece 34, and is to be swingable. The position of the adjuster 3 can be determined by rotating the adjuster 3 stepwise while engaging the engagement part 33 with the strip groove 32. In rotating the adjuster 3 stepwise, a clicking feeling is applied to a user's hand and the user is notified of change in particle size by means of the feel in the hand. Further, many linear scale marks 35 of different lengths are formed at the outer peripheral surface of the second peripheral wall 26 of the adjuster 3. As shown in FIG. 10, a reference mark 36 is provided at a lower position of the outer peripheral surface of the barrel unit 1. A ground particle size for granular food can be checked from the length of the linear scale mark 35 existing at the position of the reference mark 36. For example, if the linear scale mark 35 existing at the position of the reference mark 36 is long, a particle size may be determined to be large, and if the linear scale mark 35 existing at the position of the reference mark 36 is short, a particle size may be determined to be small. This allows the user to see a particle size easily through a visual check.

Figure 8:
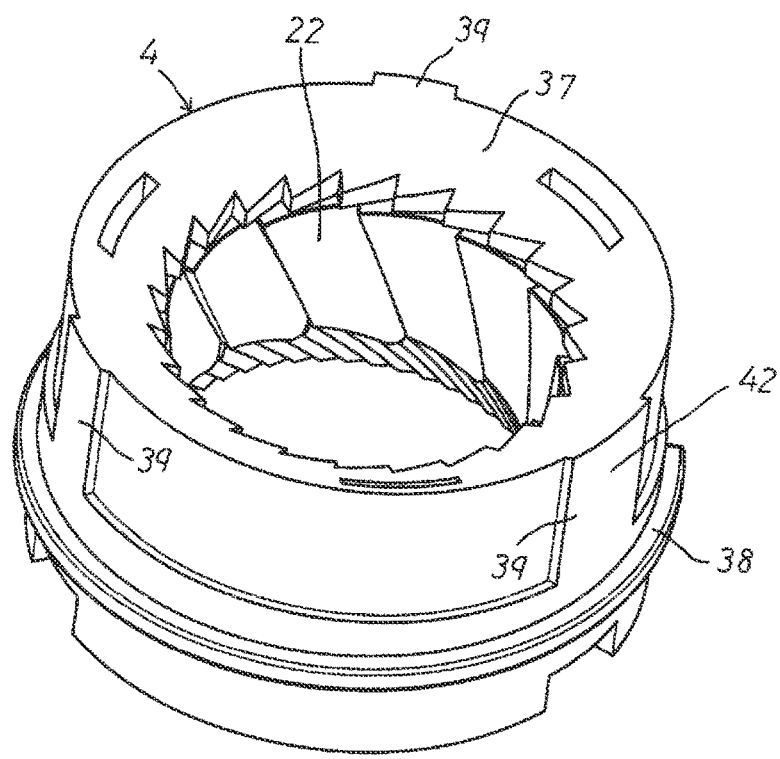
FIG. 8 is a perspective view of the outer mill unit.

A structure attaching the outer mill unit 4 to the barrel unit 1 will be described next. As shown in FIG. 8, the outer mill unit 4 forms one mill unit with a ceramic mill blade member 22 fixed in a movable member 37 made of synthetic resin. The movable member 37 has an outer peripheral surface where a threaded engagement part 38 is formed, and three projections 39, 39, 39' are formed to extend upward in the axis direction from the threaded engagement part 38. The projection 39' is wider than the other two projections 39, 39. As shown in FIGS. 10 and 11, three vertical grooves 41, 41, 41' are formed at the inner peripheral surface of the fit-in groove forming wall 40 at the inner wall 12. The vertical groove 41' is wider than the other two vertical grooves 41, 41. The outer mill unit 4 is formed in such a manner as to inscribe an outer peripheral surface 42 thereof including the projections 39, 39, 39' in the inner wall 12 of the barrel unit 1, and to inscribe the threaded engagement part 38 in the first threaded engagement part 30 of the adjuster 3 through threaded engagement. More specifically, to inscribe the outer peripheral surface 42 of the outer mill unit 4 including the projection 39 in the fit-in groove forming wall 40 of the barrel unit 1, the outer peripheral surface 42 is formed into an outer diameter less than the inner diameter of the first threaded engagement part 30 of the adjuster 3. This allows the foregoing part of the outer peripheral surface 42 of the outer mill unit 4 to pass through the interior of the first peripheral wall 25 of the adjuster 3 and to be inscribed in the fit-in groove forming wall 40.

For attaching the outer mill unit 4 to the barrel unit 1, the three projections 39, 39, 39' of the outer mill unit 4 are fitted to the ends of the corresponding three vertical grooves 41, 41, 41' of the inner wall 12. At this time, the wide projection 39' and the wide vertical groove 41' are required to be fitted to each other. This is intended to always attach the outer mill unit 4 to a fixed position of the inner wall 12 to bring the threaded engagement part 38 into a predetermined position, as the occurrence of misalignment of the threaded engagement part 38 causes a risk of mismatch between the linear scale mark 35 of the adjuster 3 and an actual particle size. As the outer mill unit 4 is pushed in the axis direction, the projections 39, 39, 39' are inserted in the axis direction into the vertical grooves 41, 41, 41'. When the projections 39, 39, 39' have been inserted slightly into the vertical grooves 41, 41, 41', the threaded engagement part 38 of the outer mill unit 4 abuts on the first threaded engagement part 30 of the adjuster 3 to stop the insertion of the projections 39, 39, 39'. Next, the adjuster 3 is rotated anticlockwise as viewed from the ejection opening 23 to automatically start threaded engagement of the first threaded engagement part 30 of the adjuster 3 with the threaded engagement part 38 of the outer mill unit 4 formed to be threadedly engageable with the first threaded engagement part 30 while the first threaded engagement part 30 rotates. As a result of the engagement between the vertical grooves 41, 41, 41' and the projections 39, 39, 39', the outer mill unit 4 moves in the axis direction inside the barrel unit 1 without rotating. When the outer mill unit 4 has moved to a movable limit, further rotation of the adjuster 3 is restricted. In this way, the outer mill unit 4 is attached to the barrel unit 1. Rotating the adjuster 3 clockwise moves the outer mill unit 4 in the opposite direction. Thus, the outer mill unit 4 is movable to the opposite sides in the axis direction by the rotation of the adjuster 3. Continuously rotating the adjuster 3 clockwise releases the threaded engagement part 38 of the outer mill unit 4 and the first threaded engagement part 30 of the adjuster 3 from the threaded engagement to allow pulling out of the outer mill unit 4 from the adjuster 3. If the ejection opening 23 is pointed downward during extraction of the outer mill unit 4, simply rotating the adjuster 3 causes the outer mill unit 4 to drop from the barrel unit 1. Thus, the outer mill unit 4 can be extracted without being touched. In this way, the outer mill unit 4 can easily be attached to the barrel unit 1 and can easily be extracted.

The inner mill unit 5 is attached on the assumption that the outer mill unit 4 is attached to the barrel unit 1 beforehand by the foregoing attachment of the outer mill unit 4. After the outer mill unit 4 is attached, the pressure unit 10 is attached to the rotary shaft 6 before attachment of the inner mill unit 5. For attaching the pressure unit 10, the ejection opening 23 of the adjuster 3 is first pointed upward, and the rotary shaft 6 is passed through the shaft passage hole 43 of the pressure unit 10 to attach the pressure unit 10 to the rotary shaft 6. The pressure unit 10 slides down the rotary shaft 6 to be elastically supported by the coil spring 8.

Next, the rotary shaft 6 is inserted into the shaft insertion hole 20 of the inner mill unit 5 to attach the inner mill unit 5 to the rotary shaft 6. As shown in FIG. 6, the attached inner mill unit 5 is located inside the outer mill unit 4 and is elastically supported while abutting on the pressure unit 10. While the tip of the rotary shaft 6 reaches the bottom of the shaft insertion hole 20 in FIG. 6, reaching the bottom is not an absolute necessity. Alternatively, as described above, the bottom of the shaft insertion hole 20 may not be closed and the shaft insertion hole 20 may be a through hole. A relatively large gap is generated between the inner peripheral surface of the shaft insertion hole 20 and the outer peripheral surface of the rotary shaft 6 inserted in the shaft insertion hole 20. The ends of the shaft insertion hole 20 and the rotary shaft 6 are hidden by the inner mill unit 5 and are thus invisible during insertion of the end of the rotary shaft 6 into the shaft insertion hole 20 of the inner mill unit 5. For this reason, a relatively large gap is generated to facilitate easy insertion of the rotary shaft 6. The gap may be narrowed while the inner mill unit 5 is maintained in a state of being extractable easily from the rotary shaft 6. In this way, the inner mill unit 5 is attached to the rotary shaft 6. In this state, however, pointing the ejection opening 23 downward unintentionally makes the inner mill unit 5 drop from the rotary shaft 6.

Figure 12:
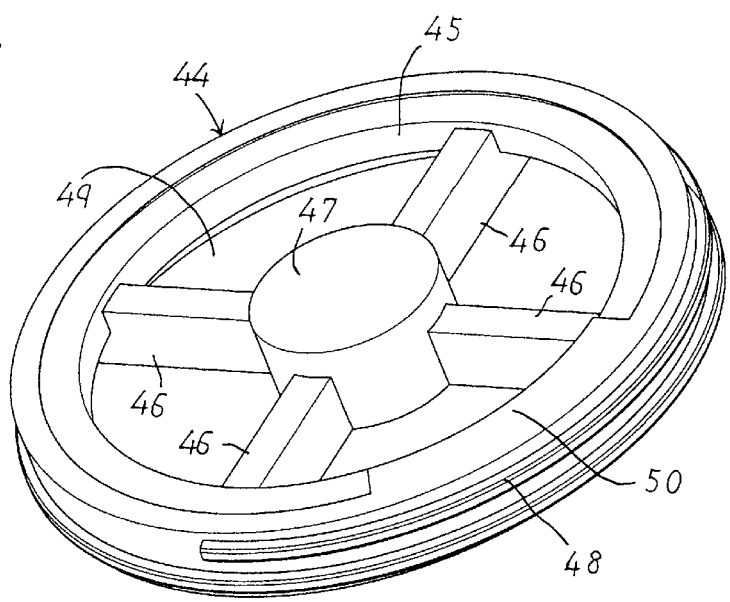
FIG. 12 is a perspective view of the movement restricting unit.
Figure 13:
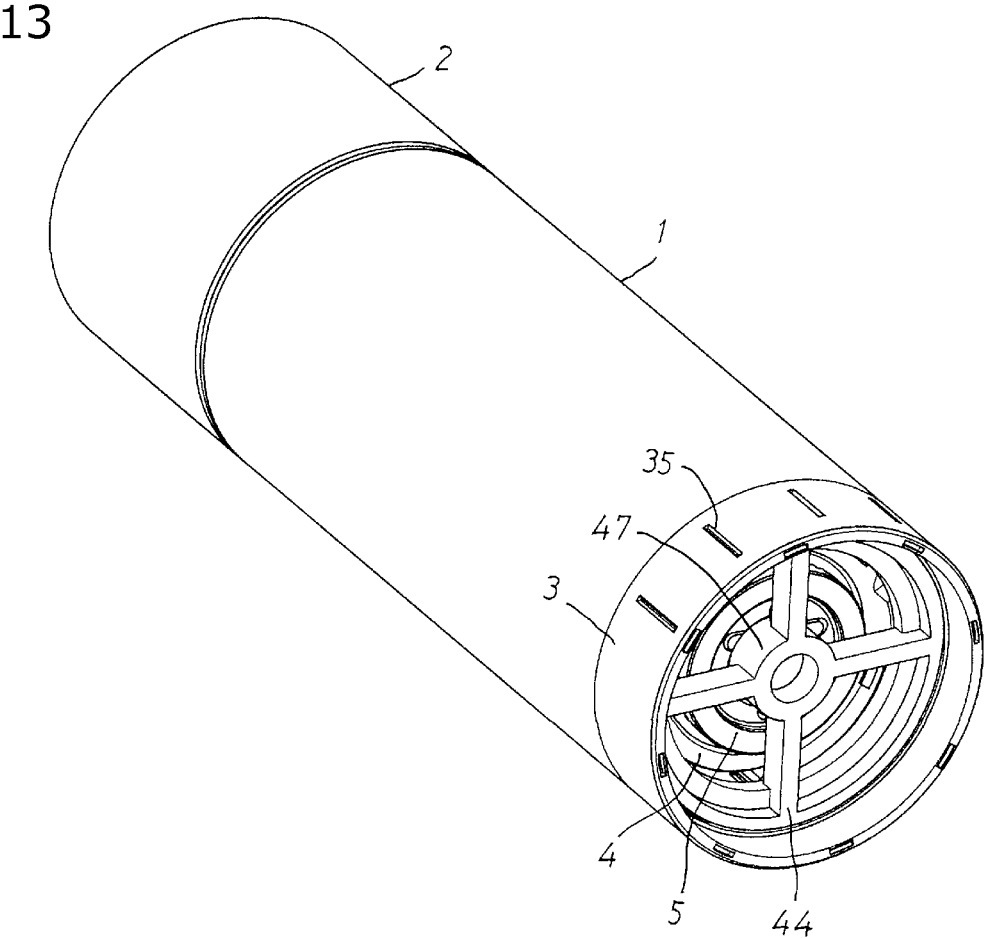
FIG. 13 is a perspective view of the present invention taken from below.

In this regard, the movement restricting unit 44 that restricts drop of the inner mill unit 5 is attached to the adjuster 3. The movement restricting unit 44 is integrally formed with synthetic resin. As shown in FIG. 12, the movement restricting unit 44 includes a circular ring part 45, and a stopper part 47 provided at the center of the ring part 45 with the intervention of four ribs 46 extending from the ring part 45 in a direction toward the center. The ring part 45 has an outer peripheral surface provided with a threaded engagement part 48. The threaded engagement part 48 is threadedly engaged with the second threaded engagement part 31 formed at the inner peripheral surface of the adjuster 3 to threadedly attach the movement restricting unit 44 in a detachable manner to the adjuster 3. For attaching the movement restricting unit 44, while the ejection opening 23 is maintained pointed upward, the movement restricting unit 44 is put inside the ejection opening 23 in such a manner that the threaded engagement part 48 of the movement restricting unit 44 is placed over the second threaded engagement part 31 of the adjuster 3. Then, the movement restricting unit 44 is rotated anticlockwise with fingertips on the ribs 46, thereby automatically engaging the threaded engagement part 48 of the movement restricting unit 44 threadedly with the second threaded engagement part 31 of the adjuster 3 formed to be threadedly engageable with the threaded engagement part 48. By rotating the movement restricting unit 44 fully to a rotational limit, the movement restricting unit 44 is attached to the barrel unit 1. This makes the inner mill unit 5 biased toward the ejection opening 23 by the coil spring 8 elastically abut on the stopper part 47 to restrict the movement of the inner mill unit 5, thereby preventing pulling out of the inner mill unit 5. As described above, the inner mill unit 5 can be attached to the rotary shaft 6 through a simple operation. Conversely, regarding extraction of the attached inner mill unit 5, rotating the movement restricting unit 44 clockwise and detaching the inner mill unit 5 from the rotary shaft 6 releases the inner mill unit 5 from the movement restriction. In this way, the inner mill unit 5 can be extracted easily.

The present invention is configured to adjust a ground particle size for granular food to be ground by rotating the adjuster 3 and changing the dimension of a gap between the mill blade member 22 of the outer mill unit 4 and the mill blade member 18 of the inner mill unit 5. This configuration will be described next. The outer mill unit 4 is movable in the vertical direction. In the presence of the attached movement restricting unit 44, however, a range of downward movement of the outer mill unit 4 is restricted by the movement restricting unit 44. The inner mill unit 5 is configured in such a manner that, while the inner mill unit 5 is biased downward by the coil spring 8, the action of the movement restricting unit 44 prevents the downward movement of the inner mill unit 5 caused by the biasing force. As shown in FIG. 6, the lower end of the movable member 37 of the outer mill unit 4 abuts on an upper surface 50 of the ring part 45 of the movement restricting unit 44. Thus, FIG. 6 shows a state in which the outer mill unit 4 is prevented from moving down further so the outer mill unit 4 is located at the lowest position of a movable range. This shows that the gap between the mill blade member 22 of the outer mill unit 4 and the mill blade member 18 of the inner mill unit 5 is narrowest. The linear scale marks 35 are set in such a manner that, at this time, the shortest scale mark comes to the position of the reference mark 36, for example. For expanding the gap, the adjuster 3 is rotated anticlockwise as viewed from below. Then, the outer mill unit 4 threadedly inscribed in the adjuster 3 is moved up by the action of the threaded engagement part, thereby allowing expansion of the gap between the mill blade member 22 of the outer mill unit 4 and the mill blade member 18 of the inner mill unit 5. The linear scale marks 35 are set in such a manner that, when the gap is widest, the longest scale mark comes to the position of the reference mark 36, for example. Making the foregoing settings allows a user to check a particle size easily. Additionally, a ground particle size is changeable in a manner that depends on an angle of rotation of the adjuster 3.

A method of detaching the outer mill unit 4 will be described next. As described above, FIG. 6 shows a state in which the lower end of the movable member 37 of the outer mill unit 4 abuts on the upper surface 50 of the ring part 45 of the movement restricting unit 44, and the outer mill unit 4 is prevented from moving downward further by the movement restricting unit 44. First, the movement restricting unit 44 is rotated clockwise as viewed from below to be detached from the adjuster 3. This corresponds to a state in which the movement restricting unit 44 is removed from FIG. 6. Thus, while the inner mill unit 5 is released from the restriction of downward movement to become extractable, the threaded engagement part 38 of the outer mill unit 4 stays threadedly engaged with the first threaded engagement part 30 of the adjuster 3. Then, the adjuster 3 is rotated clockwise as viewed below. As the movement restricting unit 44 has already been detached, the outer mill unit 4 moves down to be finally released from the threaded engagement with the adjuster 3. By doing so, the interference with the downward movement of the outer mill unit 4 in the axis direction is removed to allow extraction of the outer mill unit 4. In this way, the movement restricting unit 44 acts to restrict the movements of the inner mill unit 5 and the outer mill unit 4. Thus, the inner mill unit 5 and the outer mill unit 4 can be attached and detached only by attaching and detaching the movement restricting unit 44 to facilitate easy attachment and detachment without the need to disassemble and reassemble other parts.

For grinding granular food, the nut 14 is first rotated to be detached from the rotary shaft 6, thereby detaching the rotary operation unit 2 from the barrel unit 1. Next, the granular food is introduced from above the barrel unit 1. Next, the rotary operation unit 2 is attached to the barrel unit 1, and the rotary operation unit 2 is rotated to cause the rotation of the rotary shaft 6. The inner mill unit 5 rotates together with this rotation. As the outer mill unit 4 does not rotate, the granular food is ground in such a manner as to be rubbed on the mill blade member 22 of the outer mill unit 4 with the mill blade member 18 of the inner mill unit 5. At this time, the granular food between the mill blade member 18 and the mill blade member 22 acts to expand the gap between the mill blade members 18 and 22, thereby acting on the inner mill unit 5 to press the inner mill unit 5 downward. However, the inner mill unit 5 does not move down as the downward movement thereof is restricted by the action of the movement restricting unit 44. The granular food acts on the outer mill unit 4 to push the outer mill unit 4 upward. In this regard, while the outer mill unit 4 becomes vertically movable by the rotation of the adjuster 3, the application of force from below does not move the outer mill unit 4 upward in the absence of the rotation of the adjuster 3. The granular food ground by the outer mill unit 4 and the inner mill unit 5 drops from the gap between the mill units 4 and 5, passes through an opening 49 of the movement restricting unit 44, and is then ejected from the ejection opening 23. Examples of granular food applicable to grinding of the present invention include spices such as pepper, Japanese pepper, and cinnamon, sesame, rock salt, and coffee beans. However, the shapes of the mill blade member 18 of the inner mill unit 5 and the mill blade member 22 of the outer mill unit 4 of the embodiment are not suitable for grinding of sesame. Thus, it is preferable that the inner mill unit 5 and the outer mill unit 4 dedicated to sesame be prepared separately and changed. Namely, the present invention allows the selection and attachment of a mill unit suitably responsive to food to be ground, and allows proper use of a mill unit responsive to food. The mill of the embodiment shown in FIG. 1 has a total length of about 180 mm and a diameter of about 56 mm.

INDUSTRIAL APPLICABILITY

A mill provided herein makes a ground particle size for granular food adjustable by rotating an adjuster, facilitates attachment and detachment of an inner mill unit and an outer mill unit by releasing restriction imposed by movement restricting means, and facilitates cleaning of the inner mill unit and the outer mill unit as a result of facilitating the attachment and detachment.

REFERENCE SIGNS LIST

1 Barrel unit, 2 Rotary operation unit, 3 Adjuster, 4 Outer mill unit, 5 Inner mill unit, 6 Rotary shaft, 7 Rib, 8 Coil spring, 9 Coil spring receiver, 10 Pressure unit, 11 Outer wall, 12 Inner wall, 13 Male screw, 14 Nut, 15 Flange, 16 Bearing, 17 Shaft hole, 18 Mill blade member, 19 Core member, 20 Shaft insertion hole, 21 Blade, 22 Mill blade member, 23 Ejection opening, 24 Inner peripheral groove, 25 First peripheral wall, 26 Second peripheral wall, 27 Upper part of adjuster, 28 Fit-in groove, 29 Engagement projection, 30 First threaded engagement part, 31 Second threaded engagement part, 32 Strip groove, 33 Engagement part, 34 Tongue piece, 35 Linear scale mark, 36 Reference mark, 37 Movable member, 38 Threaded engagement part, 39, 39' Projection, 40 Fit-in groove forming wall, 41, 41' Vertical groove, 42 Outer peripheral surface, 43 Shaft passage hole, 44 Movement restricting unit, 45 Ring part, 46 Rib, 47 Stopper part, 48 Threaded engagement part, 49 Opening, 50 Upper surface of ring part, 51 Passage hole, 52 Slit

What is claimed is:

1. A mill for granular food in which a rotary operation unit is attached to a cylindrical barrel unit, wherein rotating the rotary operation unit rotates an inner mill unit to grind food stored in the barrel unit with the inner mill unit and an outer mill unit,
and wherein the ground food is ejected from an ejection opening, comprising:
an adjuster attached to the barrel unit to be rotatable relative to the barrel unit and to be prevented from coming off the barrel unit in an axis direction, a ground particle size for the food being adjusted by rotating the adjuster;
a movement attachment and detachment unit that inscribes the outer mill unit in the barrel unit and the adjuster, and makes the outer mill unit movable in the axis direction and makes the outer mill unit attachable and detachable;
a rotary shaft extending from the rotary operation unit downward along the mill for the granular food and to which the inner mill unit is attached;
a movement restricting unit that restricts movement of the inner mill unit to a predetermined position, the movement restricting unit being provided at the adjuster;
a pressure unit with a blade for pressing the food downward, the pressure unit being attached to the rotary shaft to be movable in the axis direction and to be rotatable together with the rotary shaft; and
an elastic unit that biases the pressure unit downward, wherein
the adjuster is located on the opposite side of the rotary operation unit across the barrel unit, and
releasing a restriction by the movement restricting unit makes the inner mill unit and the outer mill unit extractable.

2. The mill for granular food according to claim 1, wherein the movement attachment and detachment unit comprises:
a first threaded engagement part to threadedly engage the adjuster and the outer mill unit;
a vertical groove formed at one of an inner peripheral surface of the barrel unit and an outer peripheral surface of the outer mill unit inscribed in the inner peripheral surface; and
a projection formed at the other of the inner peripheral surface of the barrel unit and the outer peripheral surface of the outer mill unit and to be inserted into the vertical groove, and
the movement attachment and detachment unit is configured to threadedly engage the adjuster and the outer mill unit using the first threaded engagement part, and to make engagement between the vertical groove and the projection, thereby making the outer mill unit movable in the axis direction through rotation of the adjuster and prohibiting rotation of the outer mill unit relative to the barrel unit.

3. The mill for granular food according to claim 2, wherein
the movement attachment and detachment unit is configured to attach and detach the outer mill unit by moving the outer mill unit in the axis direction and making threaded engagement between the adjuster and the outer mill unit or releasing the adjuster and the outer mill unit from the threaded engagement through the rotation of the adjuster.

4. The mill for granular food according to claim 1, wherein
the movement restricting unit comprises:
a circular ring part;
a plurality of ribs extending from the ring part in a direction toward the center;
a stopper part provided at the center of the ring part with intervention of the plurality of ribs; and
a second threaded engagement part provided at an outer peripheral surface of the ring part, and
the second threaded engagement part is threadedly engaged with a third threaded engagement part formed at an inner peripheral surface of the adjuster to threadedly attach the movement restricting unit in a detachable manner to the adjuster.

5. The mill for granular food according to claim 2, wherein the movement restricting unit comprises:
a circular ring part;
a plurality of ribs extending from the ring part in a direction toward the center;
a stopper part provided at the center of the ring part with intervention of the plurality of ribs; and a second threaded engagement part provided at an outer peripheral surface of the ring part, and the second threaded engagement part is threadedly engaged with a third threaded engagement part formed at an inner peripheral surface of the adjuster to threadedly attach the movement restricting unit in a detachable manner to the adjuster.

6. The mill for granular food according to claim 3, wherein the movement restricting unit comprises:

a circular ring part;

a plurality of ribs extending from the ring part in a direction toward the center;

a stopper part provided at the center of the ring part with intervention of the plurality of ribs; and a second threaded engagement part provided at an outer peripheral surface of the ring part, and the second threaded engagement part is threadedly engaged with a third threaded engagement part formed at an inner peripheral surface of the adjuster to threadedly attach the movement restricting unit in a detachable manner to the adjuster.

7. The mill for granular food according to claim 1, wherein the elastic unit is a coil spring attached while being wound loosely around the rotary shaft.

8. The mill for granular food according to claim 6, wherein the elastic unit is a coil spring attached while being wound loosely around the rotary shaft.

* * * * *